United States Patent
Gorti et al.

(10) Patent No.: US 8,553,679 B2
(45) Date of Patent: Oct. 8, 2013

(54) ENABLING MULTIPLE SERVICE PROFILES ON A SINGLE DEVICE

(75) Inventors: Sreenivasa Rao Gorti, Austin, TX (US); Anil Kumar Doradla, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1558 days.

(21) Appl. No.: 11/267,420

(22) Filed: Nov. 4, 2005

(65) Prior Publication Data

US 2007/0104182 A1      May 10, 2007

(51) Int. Cl.
*H04L 12/66* (2006.01)

(52) U.S. Cl.
USPC ........... 370/352; 370/356; 370/354; 370/254; 370/338; 370/238; 455/410; 455/411

(58) Field of Classification Search
USPC ................ 370/351, 352–356; 455/410, 411
See application file for complete search history.

(56) References Cited

U.S. PATENT DOCUMENTS

| | | | |
|---|---|---|---|
| 6,026,291 A | 2/2000 | Carlsson et al. | |
| 6,212,372 B1 | 4/2001 | Julin | |
| 6,542,733 B1 | 4/2003 | Dennis | |
| 6,574,467 B1 | 6/2003 | Jonsson | |
| 6,591,105 B1 | 7/2003 | Hussain et al. | |
| 6,603,969 B1 | 8/2003 | Vuoristo et al. | |
| 6,657,992 B1 | 12/2003 | Christie, IV | |
| 6,771,757 B1 | 8/2004 | Torkki | |
| 6,978,156 B1 | 12/2005 | Papadopoulos et al. | |
| 6,999,763 B2 | 2/2006 | Ramalho et al. | |
| 7,136,469 B1 | 11/2006 | Ravindranath et al. | |
| 7,603,109 B2 * | 10/2009 | Barone et al. ............. | 455/414.1 |
| 2002/0037723 A1 | 3/2002 | Roach | |
| 2003/0149781 A1 * | 8/2003 | Yared et al. .................. | 709/229 |
| 2004/0102182 A1 | 5/2004 | Reith et al. | |
| 2004/0196796 A1 | 10/2004 | Bajko et al. | |
| 2005/0009520 A1 | 1/2005 | Herrero et al. | |
| 2005/0027867 A1 | 2/2005 | Mueller et al. | |
| 2005/0037746 A1 | 2/2005 | Ramalho et al. | |
| 2005/0065801 A1 | 3/2005 | Poikselka et al. | |
| 2006/0123116 A1 * | 6/2006 | Rahman et al. ............. | 709/227 |
| 2007/0058569 A1 | 3/2007 | McMenamin et al. | |
| 2007/0081519 A1 * | 4/2007 | Ramaswamy et al. ........ | 370/352 |

FOREIGN PATENT DOCUMENTS

WO    WO 99/27723    6/1999

* cited by examiner

*Primary Examiner* — Asad Nawaz
*Assistant Examiner* — Khaled Kassim

(57) ABSTRACT

The embodiments disclosed include a system and method for enabling multiple service profiles on a single telecommunications device resulting in improved flexibility for a user who wishes to access different services through multiple service profiles. The user can access multiple service profiles with a single device, and therefore switch the set of services offered to the device. In one embodiment, the techniques described below are enabled through a Session Initiation Protocol ("SIP")-based next-generation network ("NGN"), such as the IP Multimedia Subsystem ("IMS") architecture.

27 Claims, 3 Drawing Sheets

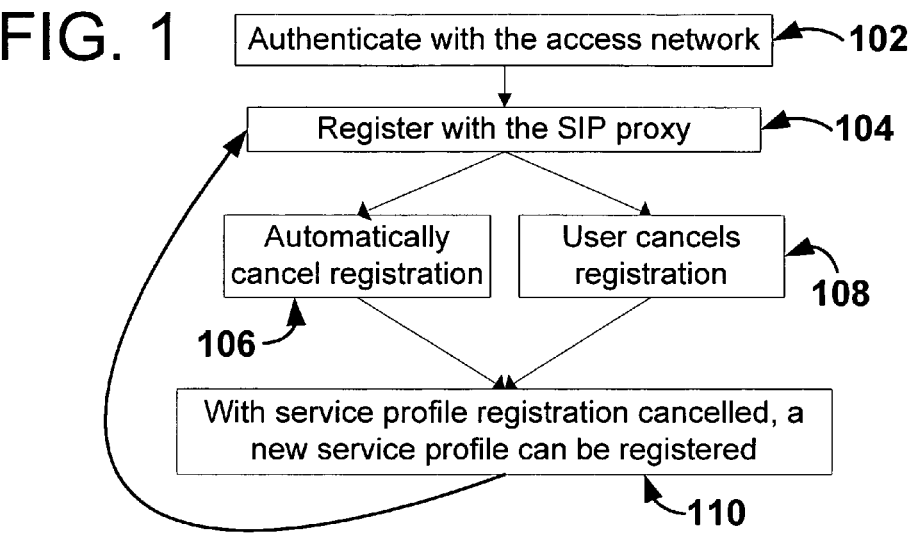
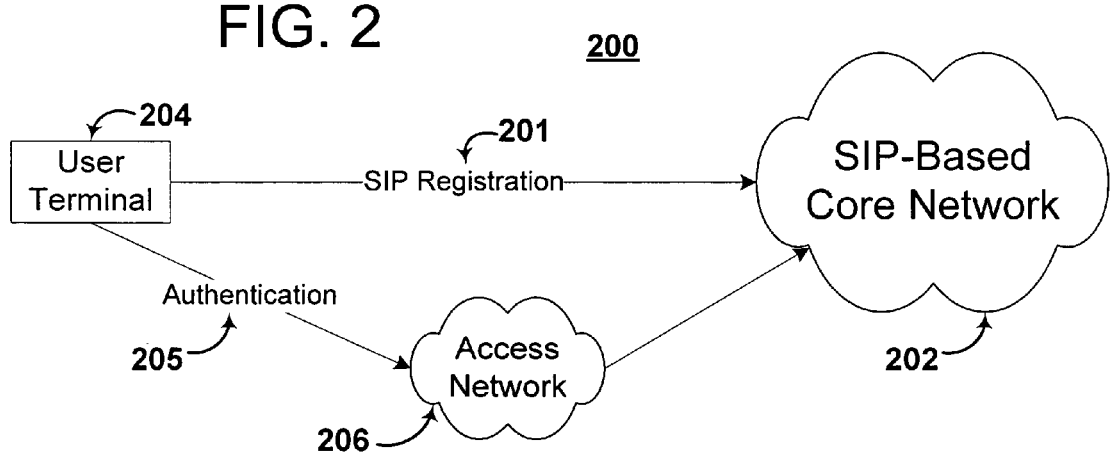

ENABLING MULTIPLE SERVICE PROFILES ON A SINGLE DEVICE

BACKGROUND

Traditional telephony service profiles are typically associated with devices, not users. The device (and device identity) may be used as a proxy for the user. Traditional telephony services associated with a particular device are then usually tied to a particular service profile. For example, when a mobile device registers with a network, the authentication/authorization process verifies the user's authentication credentials and may attach a service profile to the device based on the Home Location Register ("HLR")-provisioned information for the user. The HLR is a central database that contains details of each subscriber that is authorized to use the core network. Similar approaches are being adopted on the new Voice over IP ("VoIP") environments—the Session Initiation Protocol ("SIP") registration of the device associates the user with a particular service profile. SIP is a protocol developed by and proposed standard for initiating, modifying, and terminating an interactive user session that involves multimedia elements.

SIP-based next-generation networks ("NGN") are becoming more common in the telecommunications industry. Specifically, the IP Multimedia Subsystem ("IMS") network is SIP-based NGN for fixed IP and for mobile services. An IMS-based VoIP implementation uses SIP and runs over the standard Internet Protocol ("IP"). SIP is the signaling protocol of the IMS architecture. IMS offers a wide-range of different services, but users may have limited access or flexibility with the set of services available. IMS or other SIP-based NGNs are likely to become more common in the future, a user will want flexibility in the types of services offered through the architecture.

BRIEF DESCRIPTION OF THE DRAWINGS

The components and the figures are not necessarily to scale, emphasis instead being placed upon illustrating the principles of various embodiments.

FIG. 1 is a flow diagram illustrating a method according to an embodiment;

FIG. 2 is a block diagram illustrating a system according to an embodiment;

DETAILED DESCRIPTION

Figure 3:
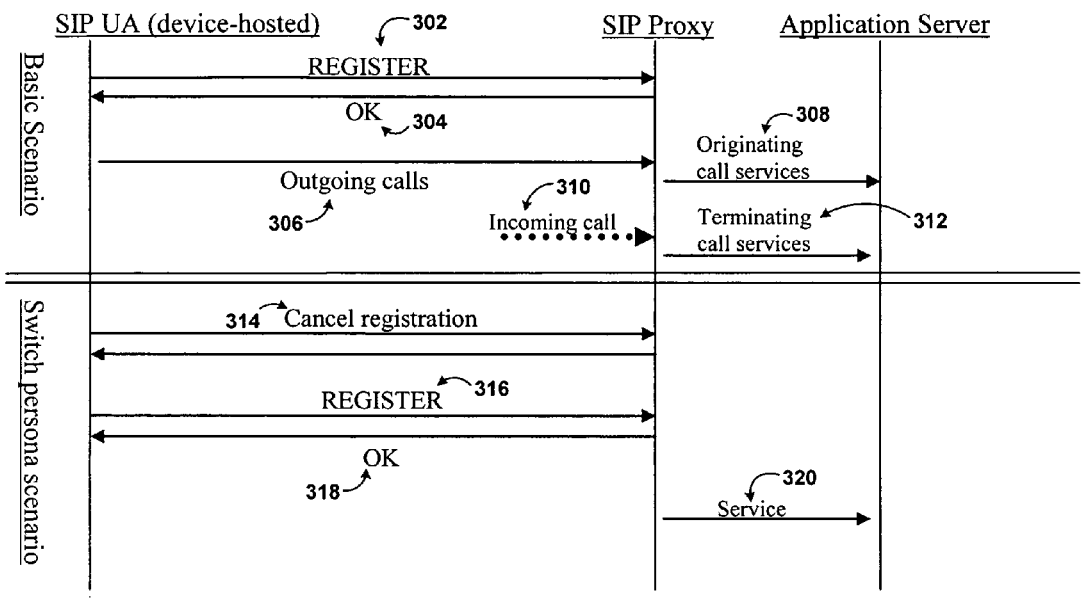
FIG. 3 is a diagram illustrating a method according to an embodiment.

By way of introduction, the embodiments described below include a method for enabling multiple service profiles for improved flexibility for a user who wishes to access different services through multiple service profiles. The user can access multiple service profiles with a single device, and therefore switch the set of services offered to the device. This allows for automatically switching through a profile configured on the user agent. The user can manually switch the profiles or intelligence in the device can perform this switch based on preferences, profile, time of day, location, etc. In one embodiment, the techniques described below are enabled through any Session Initiation Protocol ("SIP")-based next-generation network ("NGN"). One example of a SIP-based NGN is the IP Multimedia Subsystem ("IMS") architecture.

In a first aspect, a method is provided for for enabling multiple service profiles in a Session Initiation Protocol ("SIP") based network. The method includes: authenticating a device with an access network, wherein the access network is coupled with the SIP-based network; registering the device with a first service profile in the SIP-based network; wherein the authentication of the device is independent of the registration of the device; and switching the device registration to a second service profile in the SIP-based network, wherein the first service profile is associated with a first set of services and the second service profile is associated with a second set of services.

In a second aspect, a communications system is provided including a Session Initiation Protocol ("SIP")-based network operative to receive registration from a first service profile of a telecommunications device; and an access network coupled with the SIP-based network and operative to authenticate the telecommunications device with the SIP-based network, wherein the authentication is a separate process from the registration; wherein the SIP-based network is operative to receive a second registration of a second service profile of the telecommunications device.

In a third aspect, a computer-readable medium for switching personalities includes instructions for: authenticating a telecommunications device over a Session Initiation Protocol ("SIP")-based network; registering the telecommunications device with a first personality with the SIP-based network, wherein the authentication is separate from the registration; and switching the telecommunications device to a second personality in the SIP-based network.

Other systems, methods, features and advantages will be, or will become, apparent to one with skill in the art upon examination of the following figures and detailed description. It is intended that all such additional systems, methods, features and advantages be included within this description, be within the scope of this disclosure, and be protected by the following claims and be defined by the following claims. The present disclosure is defined by the following claims, and nothing in this section should be taken as a limitation on those claims. Further aspects and advantages are discussed below in conjunction with the embodiments.

The embodiments describe the mechanism that allows the user to (either implicitly or explicitly) "switch persona" as they conduct their daily routines. Multiple service profiles can be associated with a single user device and switch the set of services offered to the device. The motivation for this proposal is to enable "user-centric" or "lifestyle" services. A single user can "switch persona" as they move from a work environment to a home environment. For example, consider that a user's device is associated with his/her office services (delivered either through a PBX or a hosted Centrex solution). The user is able to access various telephony services associated with this "service profile", for example 4-digit dial, conferencing, network-address book, etc. However, when the user is traveling, the same device may be associated with his/her "personal" service profile (for example, distinctive ringing, simultaneous ringing with a home telephone, etc).

FIG. 1 is a flow diagram illustrating a method according to an embodiment. As an overview, a telecommunications device is authenticated with an access network in block 102. The device is then registered with a Session Initiation Protocol ("SIP") proxy in the SIP-based network in block 104. The user can then cancel the service profile associated with the device in block 108. Alternatively, the service profile is automatically cancelled based on existing rules for the user or device in block 106. The service profile can then be switched in block 110 by re-registering a service profile in block 104. This process allows a device to switch service profiles.

An embodiment of the system 200 is shown in FIG. 2, which is a block diagram. A user terminal 204 is authenticated 205 through an access network 206 to the SIP-based core network 202. In a separate process, the user terminal 204 is registered 201 with the SIP-based core network 202. The registration and the authentication to the SIP-based core network are separate processes. The core network may be any SIP-based network. In one embodiment, the core network may be an NGN network.

Referring to FIG. 1, in block 102, the first step is authentication with an access network. The authentication of a device or user terminal is typically Subscriber Identity Module ("SIM") based. SIM is a single application residing in a smart card that collects user subscription information and provides secure storing of a key identifying a subscriber and also subscription information, preferences and storage of other data for a subscriber on a network. The authentication of a device can be any other access-network specific authentication. In one embodiment, the access network authentication is separate from the service profile registration to the SIP-based network. The SIP-based network may be a next generation network ("NGN"). One example of a SIP-based NGN network is an IP Multimedia Subsystem ("IMS") network.

In block 104, service profile registration is typically done through a SIP registration by a Session Initiation Protocol ("SIP") user agent ("UA"). Many SIP user agents (such as XTEN, SJPHONE, MICROSOFT MESSENGER) allow a user to configure the SIP proxy. Conceptually, it is quite simple to allow this multiple proxy support to be policy-based. This conceptually simple step, however, translates to significant advantages for an end-user in terms of services accessible from the device.

This service profile SIP registration on the SIP-based network is separate from device authentication. The separation allows the SIP user agent to be configured to register under different network public user identities. There is no need to re-authenticate the device when re-registering a different profile. The user agent or user terminal with multiple service profiles registers to the core network with a first service profile, while the user agent or user terminal is authenticated over an access network. The authentication over the access network may or may not be associated with the service profile. The registration follows the standard SIP REGISTER protocol, specifying the contact IP address for the user.

When a device or user terminal registers with a SIP-based network, it is associated with a service profile that is associated with a variety of different services. The service profile may also be referred to as a personality, persona, or identity associated with the device. The service profile signifies a set of services available to a particular device upon registration. The services offered differ based on the device and the network the device is registered on. The services available on a device used at work are different than those services that a user wants while at home. Examples of services available include 4-digit dial, conferencing, network-address book, distinctive ringing, simultaneous ringing with a home telephone, etc.

Referring back to FIG. 2, the system 200 has a user terminal 204 authenticating 205 with an access network 206 like in block 102 of FIG. 1. The access network 206 is connected to the SIP-based core network 202. The authentication is a separate process from the registration of the device as in block 104 of FIG. 1. In system 200, the user terminal 204 has a SIP registration 201 with the SIP-based core network 202.

A user terminal 204 is coupled with both an access network 206 and an SIP-based core network 202. The user terminal 204 is also referred to as a telecommunications device, a user agent, or a device. The user terminal 204 may include a telephone, a cellular phone, a computer, or a personal digital assistant ("PDA") or any other device able to connect to the core network.

The SIP-based network 202 may be a next generation network ("NGN") that is a multi-media architecture for fixed IP and for mobile services. One example of a SIP-based NGN network is the IMS network. The IMS network is designed to offer the same services that are currently offered through the Internet or other IP-based networks such as VoIP, video conferencing, or other content sharing. Communication through IMS can be with voice, text, pictures, video or any combination. IMS is access independent as it supports multiple access types such as GSM, CDMA, broadband, or WLAN. IMS supports traditional telephony services and non-telephony services such as messaging and video streaming. IMS is very flexible in that it offers multiple services. Users can customize those services that they need. Any core network can support this system as long as the network authentication is separate from service registration, which is the case with SIP registration.

The registration 201 of the user terminal 204 to the core network 202 may be SIP based. SIP is an IP protocol primarily used for VoIP calls, but can be used for any type of media transfer. SIP is becoming a standard protocol for next generation networks and infrastructure. The user terminal 204 registering with the core network through a SIP-based registration is an exemplary embodiment. Other registration protocols compatible with any other SIP-based network or architecture may be used.

The access network 206 allows a user to connect to the SIP-based core network 202. Access can be accomplished through a variety of options, such as through the existing internet, mobile access such as CDMA or GSM, or wireless access. As can be seen in system 200, the authentication 205 is separate from the registration 201. The significance of this separation is that the user terminal 204 can switch between service profiles or personalities with the SIP-based network 202 independent of the authentication of the user terminal 204. As discussed above, the different service profiles or personalities are associated with different sets of services offered through the SIP-based network 202.

Referring back to FIG. 1, this switching of service profiles is shown in blocks 106, 108 and 110. A user registers with the network in block 104 with a first service profile. Then the user is able to re-register with a second service profile. In block 106, the registration of the first service profile is automatically cancelled. The automatic switching may be based on policies governing the switching. An example policy in which a profile would be automatically cancelled would be a situation when a service profile is designated for certain times of the day. A user could have a work profile available from 8:00 a.m.-5:00 p.m. and then have a personal profile from 5:00 p.m.-8:00 a.m. At 5:00 p.m. the work profile is automatically cancelled as in block 106. Then the device re-registers with the personal profile.

The policies governing automatic switching and also governing a manual switch of profiles can be established by the user. One way for the user to establish the policies governing the switching of profiles would be through a device-resident configuration graphical user interface ("GUI") allowing the user to set various preferences for either automatic or manual switching of service profiles. The user also can set a default service profile on the configuration GUI.

In one embodiment, the user has a GUI (PDA-based, PC-based) application that writes out a local XML configuration file that is read by the UA. On a mobile device, the GUI would be more limited, and consist of selecting options for things like "Personal—at home, Personal—away, Office, etc."

an alternative embodiment, there is a web page that stores the profile at a site. The configuration information could be stored at the web site, and made available to the SIP client at startup—the SIP client could be configured with a configuration URL that it links to and downloads the configuration information profile (through HTTP, TFTP, etc).

In yet another embodiment, the device may dynamically correlate explicit user selection of a profile to use with some context information, such as user location, time of day etc, and build up a history to predict which profile the user may choose at a given time. In each of these embodiments, the user may be explicitly made aware of the profile being used, through the UA display.

In an alternate embodiment, the user can manually switch profiles by canceling the current service profile as in block 108. Once the current service profile has been cancelled automatically as in block 106, or manually as in block 108, the user can then re-register with the network as in block 110. The user registers a different service profile in block 104. The user may utilize a configuration GUI to switch profiles or to choose a different profile to register with.

Referring to FIG. 3, which is a diagram illustrating a method according to an embodiment. The basic call flows are shown in FIG. 3. Two scenarios are shown. The basic scenario that is applied in the standard case and an extended scenario that is applied on re-registration. SIP protocol messages are shown in abbreviated and conceptual form and are not meant to be descriptive of all the actual protocol messages exchanged.

The SIP UA (user agent) is the device or user terminal that the user connects from. In the basic scenario, the SIP UA registers 302 with the SIP Proxy, which verifies the registration 304. The SIP UA then makes outgoing calls 306 and receives incoming calls 310 through the SIP proxy. Originating and terminating call services 308 are registered through the application server or network.

In the switch persona scenario the SIP UA cancels the registration 314. Then upon cancellation, the SIP UA can register 316 with the SIP Proxy and the SIP Proxy recognizes the registration 318. The proxy is responsible for routing requests to the appropriate application server that provides the service. The network is any SIP-based network, such as a NGN or an IMS network. All incoming and outgoing calls end up at the proxy, and then the proxy reroutes them as necessary. This rerouting may involve service logic that is applied by one or more application servers in the network. The call is then terminated either at the called party's UA, or if an intelligent call forwarding service is applicable, to other devices like GSM device or voicemail. At the point of registering a different persona or service personal, the services 320 offered with the application server are different. FIG. 3 is showing outgoing (originating) call servers, however, the same call flow may apply to incoming calls.

Figure 4:
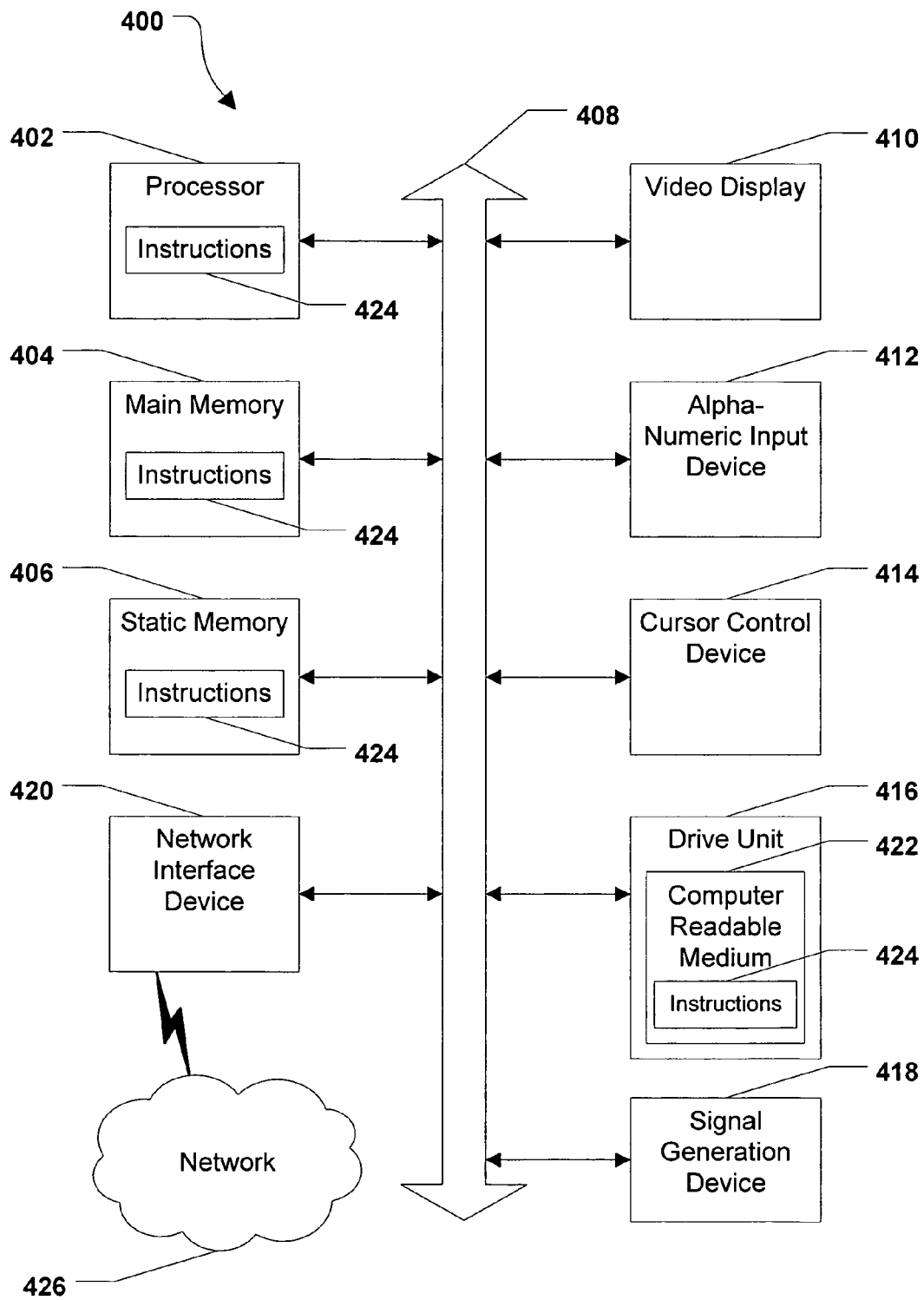
FIG. 4 is a block diagram illustrating a system according to an embodiment.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The computer system 400 may be a representation of a device or user terminal that is connected to the SIP-based network. The computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

From the foregoing, it can be seen that the present method and system provides a way to associate multiple service profiles with a single user device and switch the set of services offered to the device.

The invention claimed is:

1. A method for enabling multiple service profiles in a session initiation protocol based network, comprising:
  authenticating a device with an access network, wherein the access network is coupled with the session initiation protocol based network that is external to the access network, wherein the authenticating verifies a credential of a user;
  registering the device with a first service profile in the session initiation protocol based network to yield a device registration, wherein the authenticating of the device is independent of the registering of the device;

and switching the device registration to a second service profile in the session initiation protocol based network, wherein the first service profile is associated with a first set of services and the second service profile is associated with a second set of services, further wherein the device remains authenticated while the device registration is switched to the second service profile, wherein a service provided by the session initiation protocol based network is accessible by the device through the access network, wherein the switching to the second service profile is based on a policy, governing the switching, wherein the policy governing the switching comprises canceling the first profile when a designated time for the first profile expires.

2. The method according to claim 1, wherein the session initiation protocol based network is a next-generation network.

3. The method according to claim 2, wherein the next-generation network is an internet protocol multimedia subsystem network.

4. The method according to claim 1, wherein the device comprises a personal digital assistant.

5. The method according to claim 1, wherein the authenticating the device comprises using a subscriber identity module.

6. The method according to claim 1, wherein the first service profile comprises a default profile that is registered automatically.

7. The method according to claim 1, wherein the switching to the second service profile comprises:
   unregistering the device with the first service profile in the session initiation protocol based network; and
   registering the device with the second service profile in the session initiation protocol based network.

8. The method according to claim 1, wherein the switching to the second service profile is performed automatically.

9. The method according to claim 1, wherein the policy governing the switching further comprises the first service profile being registered at a first time of a day and the second service profile being registered at a second time of the day.

10. The method according to claim 1, wherein the first service profile is a work profile and the second service profile is a home profile.

11. A communications system, comprising:
   a session initiation protocol based network operative to register a registration from a first service profile of a telecommunications device; and an access network coupled with the session initiation protocol based network and operative to provide an authentication of the telecommunications device with the session initiation protocol based network that is external to the access network, wherein the authentication is a separate process from the registration, wherein the authentication verifies a credential of a user;
   wherein the session initiation protocol based network is operative to register a second registration from a second service profile of the telecommunications device and to switch the telecommunication device registration to the second service profile based on a policy, governing a switching of the telecommunications device registration,
   wherein the policy governing the switching comprises canceling the first profile when a designated time for the first profile expires, further wherein the telecommunications device remains authenticated while the registration is switched to the second service profile, wherein a service provided by the session initiation protocol based network is accessible by the telecommunications device through the access network.

12. The communications system according to claim 11, wherein the session initiation protocol based network is a next-generation network.

13. The communications system according to claim 12, wherein the next generation network is an internet protocol multimedia subsystem network.

14. The communications system according to claim 11, wherein the telecommunications device comprises a personal digital assistant.

15. The communications system according to claim 11, wherein registering the first service profile comprises using a session initiation protocol proxy.

16. The communications system according to claim 12, wherein the first service profile comprises a default profile that is registered automatically.

17. The communications system according to claim 11, wherein the first service profile is associated with a first set of services and the second service profile is associated with a second set of services.

18. The communications system according to claim 11, wherein the first service profile is a work profile and the second service profile is a home profile.

19. The communications system according to claim 11, wherein the switching the telecommunication device registration to the second service profile comprises unregistering the first service profile.

20. An article of manufacture comprising a non-transitory computer-readable storage medium having stored therein data representing instructions executable by a programmed processor for switching personalities, the computer-readable storage medium comprising instructions for:
   registering a registration of a telecommunications device with a first personality with an internet protocol multimedia subsystem network, wherein the telecommunications device is provided with an authentication by an access network coupled to the internet protocol multimedia subsystem network that is external to the access network, wherein the authentication is separate from the registration, wherein the authentication verifies a credential of a user; and
   switching the telecommunications device to a second personality in the internet protocol multimedia subsystem network, wherein the switching to the second personality is based on a policy governing the switching, wherein the policy governing the switching comprises canceling the first profile when a designated time for the first profile expires, wherein the telecommunications device remains authenticated while the registration is switched to the second personality, wherein a service provided by the session initiation protocol based network is accessible by the telecommunications device through the access network.

21. The article of manufacture of claim 20, wherein the internet protocol multimedia subsystem network is access independent.

22. The article of manufacture of claim 21, wherein the internet protocol multimedia subsystem network supports multiple access types.

23. The article of manufacture of claim 20, wherein the telecommunications device comprises a personal digital assistant.

24. The article of manufacture of claim 20, wherein registering the first personality comprises using a session initiation protocol proxy.

25. The article of manufacture of claim 20, wherein the first personality is associated with a first set of services and the second personality is associated with a second set of services.

26. The article of manufacture of claim 20, wherein the first personality comprises a default personality that is registered automatically.

27. The article of manufacture of claim 20, wherein the switching to the second personality comprises:
    unregistering the telecommunications device with the first personality with the internet protocol multimedia subsystem network; and
    registering the telecommunications device with the second personality with the internet protocol multimedia subsystem network.

\* \* \* \* \*